(12) United States Patent
Kolar et al.

(10) Patent No.: US 11,569,737 B2
(45) Date of Patent: Jan. 31, 2023

(54) TRANSFORMER FOR A THREE-PORT VOLTAGE CONVERTER, THREE-PORT VOLTAGE CONVERTER AND METHOD FOR TRANSMITTING ELECTRICAL POWER

(71) Applicant: Robert Bosch GmbH, Stuttgart (DE)

(72) Inventors: Johann W. Kolar, Zürich (CH); Dominik Bortis, Zürich (CH); Jannik Robin Schaefer, Wädenswil (CH)

(73) Assignee: Robert Bosch GmbH, Stuttgart (DE)

( * ) Notice: Subject to any disclaimer, the term of this patent is extended or adjusted under 35 U.S.C. 154(b) by 314 days.

(21) Appl. No.: 16/770,274

(22) PCT Filed: Nov. 22, 2018

(86) PCT No.: PCT/EP2018/082171
§ 371 (c)(1),
(2) Date: Jun. 5, 2020

(87) PCT Pub. No.: WO2019/110314
PCT Pub. Date: Jun. 13, 2019

(65) Prior Publication Data
US 2020/0381176 A1   Dec. 3, 2020

(30) Foreign Application Priority Data
Dec. 6, 2017 (DE) .................. 10 2017 222 087.2

(51) Int. Cl.
*H02M 3/335* (2006.01)
*H02M 3/00* (2006.01)
*H01F 30/04* (2006.01)

(52) U.S. Cl.
CPC ......... *H02M 3/01* (2021.05); *H02M 3/33569* (2013.01); *H01F 30/04* (2013.01)

(58) Field of Classification Search
CPC .... H01F 27/2895; H01F 27/306; H02M 3/01; H02M 3/335–42
See application file for complete search history.

(56) References Cited

U.S. PATENT DOCUMENTS 3,694,726 A   9/1972   Cielo et al.
5,737,203 A   4/1998   Barrett
(Continued)

FOREIGN PATENT DOCUMENTS

DE   102014220434   4/2016
EP   3203624   8/2017
(Continued)

OTHER PUBLICATIONS

International Search Report for Application No. PCT/EP2018/082171 dated Mar. 28, 2019 (English Translation, 2 pages).

*Primary Examiner* — Peter M Novak
(74) *Attorney, Agent, or Firm* — Michael Best & Friedrich LLP

(57) ABSTRACT

The invention relates to the galvanically isolated transmission of electrical power between three voltage systems. For this purpose, a transformer is provided which comprises a total of five windings. The transmission between the individual voltage systems can be controlled by targeted manner activation of the individual windings.

7 Claims, 6 Drawing Sheets

(56) References Cited

U.S. PATENT DOCUMENTS

| | | | |
|---|---|---|---|
| 7,193,866 B1 * | 3/2007 | Huang | H02M 1/08 363/22 |
| 2002/0034083 A1 | 3/2002 | Ayyanar et al. | |
| 2005/0270806 A1 | 12/2005 | Zhu | |
| 2015/0357116 A1 | 12/2015 | Yamakawa et al. | |
| 2016/0322968 A1 * | 11/2016 | Mao | H03F 1/0222 |

FOREIGN PATENT DOCUMENTS

| | | |
|---|---|---|
| JP | H236015 U | 3/1990 |
| JP | 2000134928 A | 5/2000 |
| JP | 2002325449 A | 11/2002 |
| JP | 2003273559 A | 9/2003 |
| JP | 2010093952 A | 4/2010 |
| WO | 2016031061 A1 | 3/2016 |

* cited by examiner

TRANSFORMER FOR A THREE-PORT VOLTAGE CONVERTER, THREE-PORT VOLTAGE CONVERTER AND METHOD FOR TRANSMITTING ELECTRICAL POWER

BACKGROUND OF THE INVENTION

The present invention relates to a transformer, a three-port voltage converter having such a transformer and a method for transferring electrical energy using such a transformer.

DE 10 2014 220 434 A1 discloses a DC-DC converter with a plurality of resonant converters connected in parallel. Here, the number of resonant converters, which transfer power from a primary side to a secondary side, depends on the power consumption of a secondary-side load.

As a rule, electric and hybrid vehicles have two different vehicle electrical systems. All low-voltage consumers such as, e.g., an onboard computer, lighting units and entertainment electronics are supplied in a low-voltage system, which is buffered by an accumulator. Moreover, a high-voltage system, fed by a high-voltage accumulator, supplies electrical energy for the drive. In particular, the electrical energy for the low-voltage system can be provided by the high-voltage side. To this end, use can be made of DC converters which, for safety-related reasons, must have galvanic isolation between the high-voltage system and the low-voltage system.

Moreover, the accumulators of an electric or hybrid vehicle can be charged by way of an external voltage supply. Here too, galvanic isolation should be provided for safety-related reasons, and so, overall, there are three voltage systems, galvanically isolated from one another in each case.

SUMMARY OF THE INVENTION

The following is provided:

A transformer for a three-port voltage converter comprising a first ring-shaped transformer core, a second ring-shaped transformer core, a first primary winding, a second primary winding, a first secondary winding, a second secondary winding and a tertiary winding. The first primary winding is disposed on the first transformer core. The second primary winding is disposed on the second transformer core. The first secondary winding is disposed on the first transformer core. The second secondary winding is disposed on the second transformer core. Finally, the tertiary winding is disposed both on the first transformer core and on the second transformer core. In particular, the term "disposed" should be understood to mean that the respective winding is wound around the respective transformer core. By way of example, a closed transformer core structure, in particular a toroidal or rectangular transformer core structure, is an option for a ring-shaped transformer core.

Furthermore, the following is provided:

A three-port voltage converter comprising a transformer according to the invention, a first driver circuit, a second driver circuit and a rectifier circuit. The first driver circuit is configured to provide a first AC voltage at the first primary winding and to provide a second AC voltage at the second primary winding. The second driver circuit is designed to rectify an AC voltage applied to the first secondary winding and also to rectify an AC voltage applied to the second secondary winding. In particular, the second driver circuit can provide the rectified voltages at an output connector as a DC voltage. Further, the second driver circuit can be designed to provide a first AC voltage at the first primary winding and provide a second AC voltage at the second primary winding. The rectifier circuit can be designed to rectify an AC voltage applied to the tertiary winding. The rectified AC voltage can be provided at an output connector of the rectifier circuit.

Further, the following is provided:

A method for transferring electrical energy using a transformer according to the invention, including the steps of providing a first AC voltage at the first primary winding and of providing a second AC voltage at the second primary winding with a time offset in relation to the provision of the first AC voltage. In particular, the time delay can be set on the basis of a target voltage at the tertiary winding.

Finally, the following is provided:

A method for transferring electrical energy using a transformer according to the invention, including the steps of providing a first AC voltage at the first secondary winding and of providing a second AC voltage at the second secondary winding. Here, a magnetic flux caused by the first AC voltage in the first transformer core and a magnetic flux caused by the second AC voltage in the second transformer core can extend in the same direction in a region of the second transformer core surrounded by the tertiary winding.

The present invention is based on the discovery that, as a rule, electric and hybrid vehicles have three separated voltage systems. In addition to a low-voltage vehicle electrical system and a high-voltage vehicle electrical system of the vehicle, there furthermore is a connector for feeding electrical energy for charging the accumulators in the vehicle. Here, all of these three vehicle electrical systems should be galvanically isolated from one another. Here, a cost-effective and efficient coupling for the galvanically isolated coupling of the three voltage systems is desirable.

The present invention is therefore based on the object of taking account of this discovery and of coupling the three voltage systems by means of a galvanically isolating voltage converter. In particular, this can be realized by the use of a common transformer with five separate windings. Here, the five windings are disposed, i.e., wound, on two ring-shaped transformer cores. By way of example, a toroidal transformer core should be considered to be a ring-shaped transformer core. However, in this case, ring-shaped need not mean circular or oval but instead could also comprise a rectangular or square, closed transformer core structure. In particular, such a closed transformer core structure can be realized by a U-shaped transformer core with a yoke disposed thereover (UI core). However, any other inherently closed transformer core structures are possible. Additionally, the two individual transformer cores can be realized by a common transformer core with two inherently closed transformer core structures. By way of example, this can be realized by an E-shaped transformer core structure with a yoke disposed thereover (E core).

By way of example, for the purposes of increasing the leakage inductance, the transformer cores denoted ring-shaped or closed may have one or more discrete air gaps. By way of example, an air gap can be provided between a limb and a yoke of a transformer core.

Moreover, the transformer cores could also comprise ferromagnetic powder particles. Transformer cores with ferromagnetic powder particles are also referred to as "powder cores" or as cores with a distributed air gap.

For the two high-voltage-side connectors, for example for the connector assigned to an external voltage source and the high-voltage connector of an electric or hybrid vehicle, two windings are provided in each case, with respectively one of the two windings being disposed around the first transformer core and one of the two windings being respectively disposed about the second transformer core. A third winding, which may be assigned for example to a low-voltage vehicle electrical system of an electric or hybrid vehicle, can be wound about both transformer cores together. In particular, this tertiary winding could also be wound about a limb assigned to both transformer cores in the case of a combined transformer core arrangement for the first transformer core and the second transformer core.

Suitable driving of the individual transformer windings allows targeted control of the energy transfer between the individual windings. When transferring energy from the primary windings, which could be assigned to an external voltage supply of an electric or hybrid vehicle, for example, to the secondary windings, which could be assigned to the high-voltage vehicle electrical system of an electric or hybrid vehicle, for example, it is possible, in particular, to control at the same time the component of energy transferred to the tertiary winding, wherein the tertiary winding could be assigned to a low-voltage electrical system of an electric or hybrid vehicle, for example.

This allows targeted transfer of electrical energy between three voltage systems by means of a single efficient and compact transformer arrangement, wherein galvanic isolation can be realized between all three voltage systems.

In one possible embodiment, the first transformer core and the second transformer core comprise a common limb. In particular, the tertiary winding can be disposed around this common limb. As already described above, a particularly efficient and compact transformer arrangement can be realized by such a transformer core arrangement, in which the two transformer cores are realized as a common transformer core structure.

In one possible embodiment of the three-port voltage converter, the first driver circuit is designed to set a time delay between the provision of the first AC voltage at the first primary winding and the provision of the second AC voltage at the second primary winding. In particular, the time delay can be set on the basis of a target voltage at the tertiary winding.

As a rule, the first AC voltage and the second AC voltage have the same frequency. The provision of the first AC voltage at the first primary winding and the provision of the second AC voltage at the second primary winding can start, in each case, with an AC voltage rising from 0 V. In this way, a phase difference arises between the two AC voltages as a result of the provision of a time offset between the first AC voltage and the second AC voltage, particularly in the case where the two AC voltages are at the same frequency.

By varying this time delay between the provision of the first AC voltage and the provision of the second AC voltage at the primary windings, it is possible to control the magnetic flux through the limb of the transformer core about which the tertiary winding is wound. In this way, it is possible to adapt the voltage at the tertiary winding by way of the time delay between the two AC voltages at the primary windings. In particular, this allows the power transfer from the primary winding to the tertiary winding to be controlled.

In one possible embodiment, the first driver circuit comprises a primary resonant circuit which is electrically coupled to the first primary winding. Further, the first driver circuit can comprise a second primary resonant circuit which is electrically coupled to the second primary winding. The resonant circuits on the primary side of the three-port voltage converter consequently facilitate the construction of a DC voltage resonant converter. In particular, the resonant circuit can be realized, for example, by connecting an inductor and a capacitor in series. The dimensions of the components can be adapted, in particular, to the desired frequencies in the resonant converter in this case.

In one possible embodiment, the first driver circuit is configured to provide a respective rectangular voltage to the first primary resonant circuit and to the second primary resonant circuit. In particular, the duty cycle of the rectangular voltages can be adapted on the basis of an electric power to be transferred. This allows the electric power to be transferred in the three-port voltage converter to be adapted and set on the basis of the duty cycle to be set. This facilitates a particularly simple closed-loop control of the electric power to be transferred in the three-port voltage converter.

In one possible embodiment, the second driver circuit comprises a secondary resonant circuit. In particular, the secondary resonant circuit of the second driver circuit can be electrically coupled at a node to the first secondary winding and to the second secondary winding. In particular, the resonant circuit can comprise an inductor and a capacitor which are connected in series. The dimensions of the components can be adapted to a resonant frequency to be set. Such a secondary resonant circuit facilitates a resonant voltage converter in which electrical energy can also be fed by the secondary windings.

In one possible embodiment, the second driver circuit comprises a first secondary resonant circuit which is electrically coupled to the first secondary winding and a second secondary resonant circuit which is electrically coupled to the second secondary winding. Further, the rectifier circuit can comprise a tertiary resonant circuit, which is electrically coupled to the tertiary winding. This allows a resonant voltage converter to be realized without a resonant circuit being required on the primary side.

The aforementioned embodiments and developments can be combined with one another as desired, provided the result is meaningful. Further embodiments, developments and implementations of the invention also comprise combinations, not explicitly specified, of features of the invention described above or described below with respect to the exemplary embodiments. In particular, a person skilled in the art will also add individual aspects as improvements or supplements to the respective basic forms of the invention in the process.

BRIEF DESCRIPTION OF THE DRAWINGS

The present invention will be explained in more detail below on the basis of the embodiments specified in the schematic figures of the drawings. In detail.

DETAILED DESCRIPTION

In the following description, the same reference signs denote the same or equivalent elements.

Figure 1:
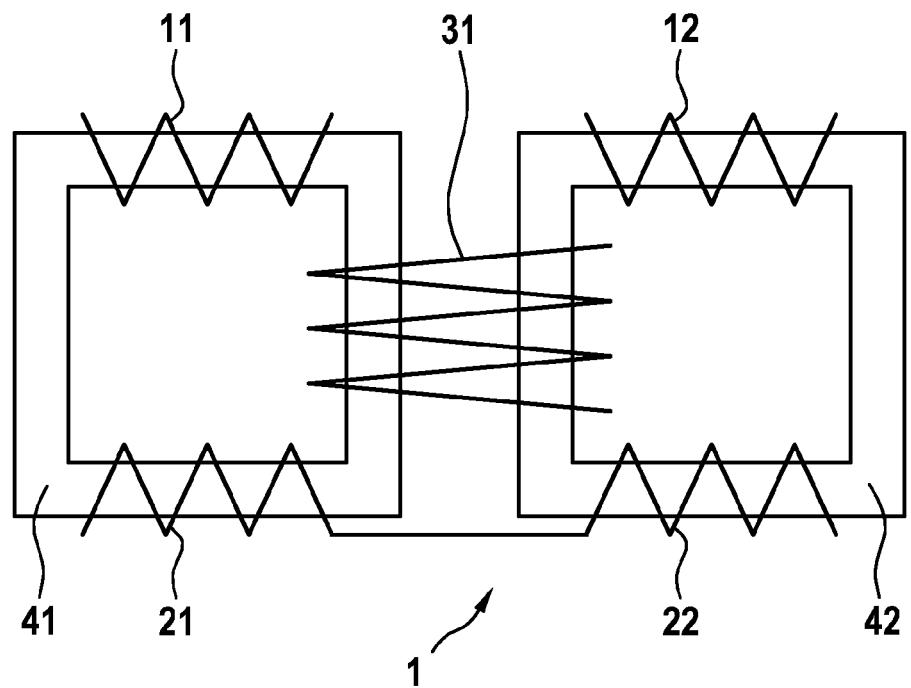
FIG. 1 shows a schematic illustration of a transformer for a three-port voltage converter according to one embodiment.

FIG. 1 shows a schematic illustration of a transformer 1 as could be used, for example, for a three-port voltage converter. The transformer 1 comprises a first transformer core 41 and a second transformer core 42. The two transformer cores 41 and 42 are ring-shaped transformer cores. By way of example, a toroidal transformer core structure can be considered to be a ring-shaped transformer core. However, ring-shaped is not restricted to circular or possibly oval. Rather, a structure, in particular a closed structure, made of a plurality of straight transformer core elements, which form e.g. a rectangular or square structure, can also be considered to be a ring-shaped transformer core structure. By way of example, such a closed transformer core structure could be formed by a U-shaped transformer core and a yoke disposed thereover. Moreover, any other transformer core structure that forms a closed transformer core could be considered to be a ring-shaped transformer core.

The ring-shaped transformer cores 41, 42 could optionally have one or more discrete air gaps. By way of example, one or more air gaps could be provided between a limb and a yoke of a transformer core 41, 42. Moreover, the transformer cores 41, 42 could also comprise ferromagnetic powder particles. Transformer cores with ferromagnetic powder particles are also referred to as so-called powder cores or as cores with a distributed air gap. As a result of this, it is possible, for example, to influence the magnetic flux in the respective transformer core 41, 42.

Moreover, transformer 1 comprises five windings 11, 12, 21, 22, 31. These five windings 11, 12, 21, 22, 31 are assigned to three voltage systems. A first primary winding 11 and a second primary winding 12 are assigned to a first voltage system. A first secondary winding 21 and a second secondary winding 22 are assigned to a second voltage system. A tertiary winding 31 is assigned to a third voltage system. The first primary winding 11 is disposed on the first transformer core 41; i.e., the first primary winding 11 is wound around the first transformer core 41 in a predetermined region. The second primary winding 12 is disposed on the second transformer core 42. Here, the first primary winding 11 and the second primary winding 12 can have the same embodiment or an embodiment that is at least approximately the same. In particular, the first primary winding 11 and the second primary winding 12 can have the same number of turns. The first secondary winding 21 is disposed on the first transformer core 41 and the second secondary winding 22 is disposed on the second transformer core 42. In particular, the first secondary winding 21 and the second secondary winding 22 can have the same embodiment and, for example, have the same number of turns. The first secondary winding 21 and the second secondary winding 22 can be electrically connected to one another at a node K. As a result of the above-described arrangement, the first primary winding 11 can cause a magnetic flux in the first transformer core 41, which in turn induces a voltage in the first secondary winding 21. Analogously, the second primary winding 12 can cause a magnetic flux in the second transformer core 42, which induces a voltage in the second secondary winding 22.

Moreover, the transformer 1 comprises a tertiary winding 31, which is disposed both on the first transformer core 41 and on the second transformer core 42. Expressed differently, the turns of the tertiary winding 31 surround both the first transformer core 41 and the second transformer core 42, in each case in a predetermined region. This allows a voltage to be induced in the tertiary winding 31, which voltage corresponds to the sum of the magnetic fluxes in the two transformer cores 41 and 42. However, the direction of the magnetic fluxes should also be taken into account here. If the magnetic flux through the tertiary winding 31 in the first transformer core 41 is opposed to the magnetic flux through the tertiary winding 31 in the second transformer core 42, the two magnetic fluxes can at least approximately cancel one another such that, overall, no voltage or only a small voltage is induced in the tertiary winding 31.

Figure 2:
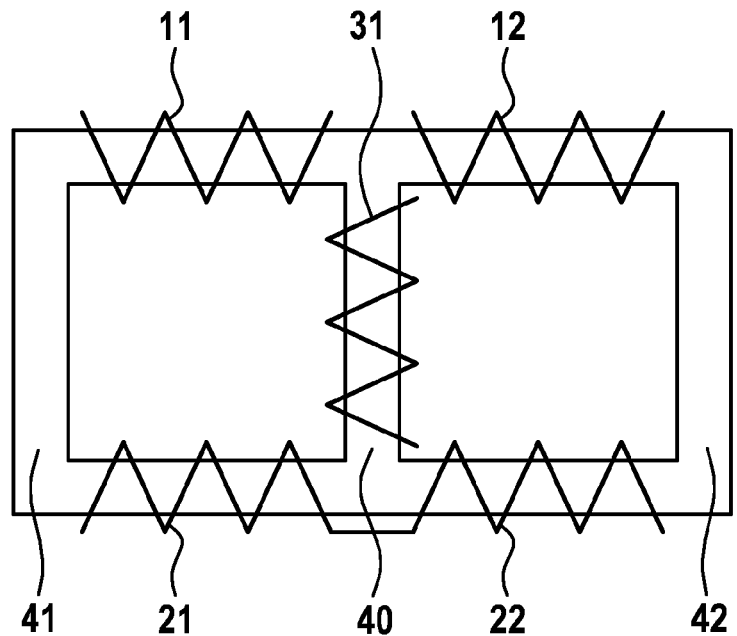
FIG. 2 shows a schematic illustration of a transformer for a three-port voltage converter according to further embodiment.

FIG. 2 shows a schematic illustration of a transformer 1 according to a further embodiment. In this embodiment, the transformer 1 at least largely corresponds to the transformer 1 from FIG. 1. Therefore, the statements made in respect of FIG. 1 also apply to FIG. 2. The transformer 1 in FIG. 2 only differs from the transformer in FIG. 1 in that the first transformer core 41 and the second transformer core 42 are formed by a common transformer core. In particular, the two limbs of the first transformer core 41 and of the second transformer core 42 around which the tertiary winding 31 is wound are combined to form a single limb 40. By way of example, such a transformer core can be formed by an E-shaped structure with a straight yoke disposed thereover. However, other options for forming a combined transformer core as per FIG. 2 are also possible.

Figure 3:
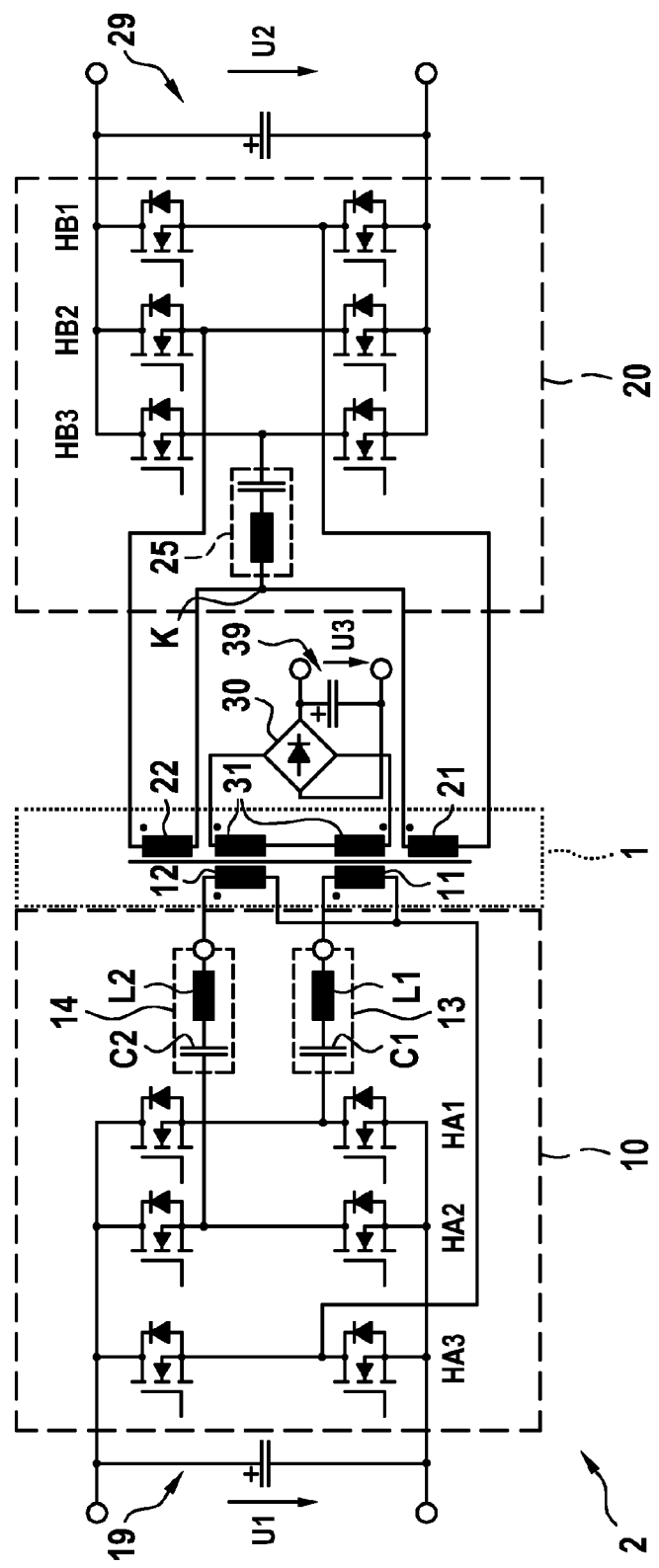
FIG. 3 shows a schematic illustration of a schematic diagram for a three-port voltage converter according to one embodiment.

FIG. 3 shows a schematic illustration of a schematic diagram of a three-port voltage converter 2 as per one embodiment. The first primary winding 11 and the second primary winding 12 can be driven individually by a first driver circuit 10. In the exemplary embodiment illustrated here, the first driver circuit 10 comprises a DC voltage connector 19, at which a DC voltage U1 can be provided. Furthermore, the first driver circuit 10 comprises three half bridges HA1, HA2 and HA3, each with two switching elements, e.g. two semiconductor switching elements. The three half bridges HA1, HA2 and HA3 are electrically coupled at a common node to the positive connector of the DC voltage connector 19 and the negative connector of the DC voltage connector 19 is electrically coupled at an opposite node to the three half bridges HA1, HA2, HA3. A first primary resonant circuit 13, for example a series resonant circuit made of a first inductor L1 and a first capacitor C1, can be provided between a central node of the first half bridge HA1 and a connector of the first primary winding 11. Analogously, a second primary resonant circuit 14 can be provided between a central node of the second half bridge HA2 and a connector of the second primary winding 12. This second primary resonant circuit 14 can also be formed, for example, by means of a series resonant circuit made of a second inductor L2 and a second capacitor C2. The two other connectors of the first primary winding 11 and the second primary winding 12 are electrically connected to a central node of the third half bridge HA3.

The first and second secondary winding 21, 22 can be connected to a second driver circuit 20. The second driver circuit 20 can rectify the voltages induced in the first secondary winding 21 and in the second secondary winding 22 and can provide said voltages at a connector 29 of the second driver circuit 20. Further, the second driver circuit 20 can also convert a DC voltage U2 provided at the connector 29 to excite the first secondary winding 21 and the second secondary winding 22. By way of example, the second driver circuit 20 comprises three half bridges FIB 1, HB2, HB3. By way of example, each half bridge FIB 1, HB2, HB3 can comprise two semiconductor switching elements. The three half bridges HB1, HB2, HB3 of the second driver circuit can be connected to the positive connection point of the connector 29 on one side and to a negative connection element of the connector 19 on the other side. A connector of the first secondary winding 21 and a connector of the second secondary winding 22 can be electrically interconnected at a node K. By way of example, this node K can be connected to a central node of the third half bridge HB3 via a secondary resonant circuit 25, in particular a series resonant circuit made of an inductor and a capacitor. A central node of the first half bridge HB1 and of the second half bridge HB2 can be connected to the other connector of the first secondary winding 21 and of the second secondary winding 22, respectively.

The connectors of the tertiary winding 31 can be connected to a rectifier circuit 30. In this way, a voltage induced in the tertiary winding 31 can be rectified and the rectified voltage U3 can be provided at a connector 39 of the rectifier circuit 30.

Figure 4:
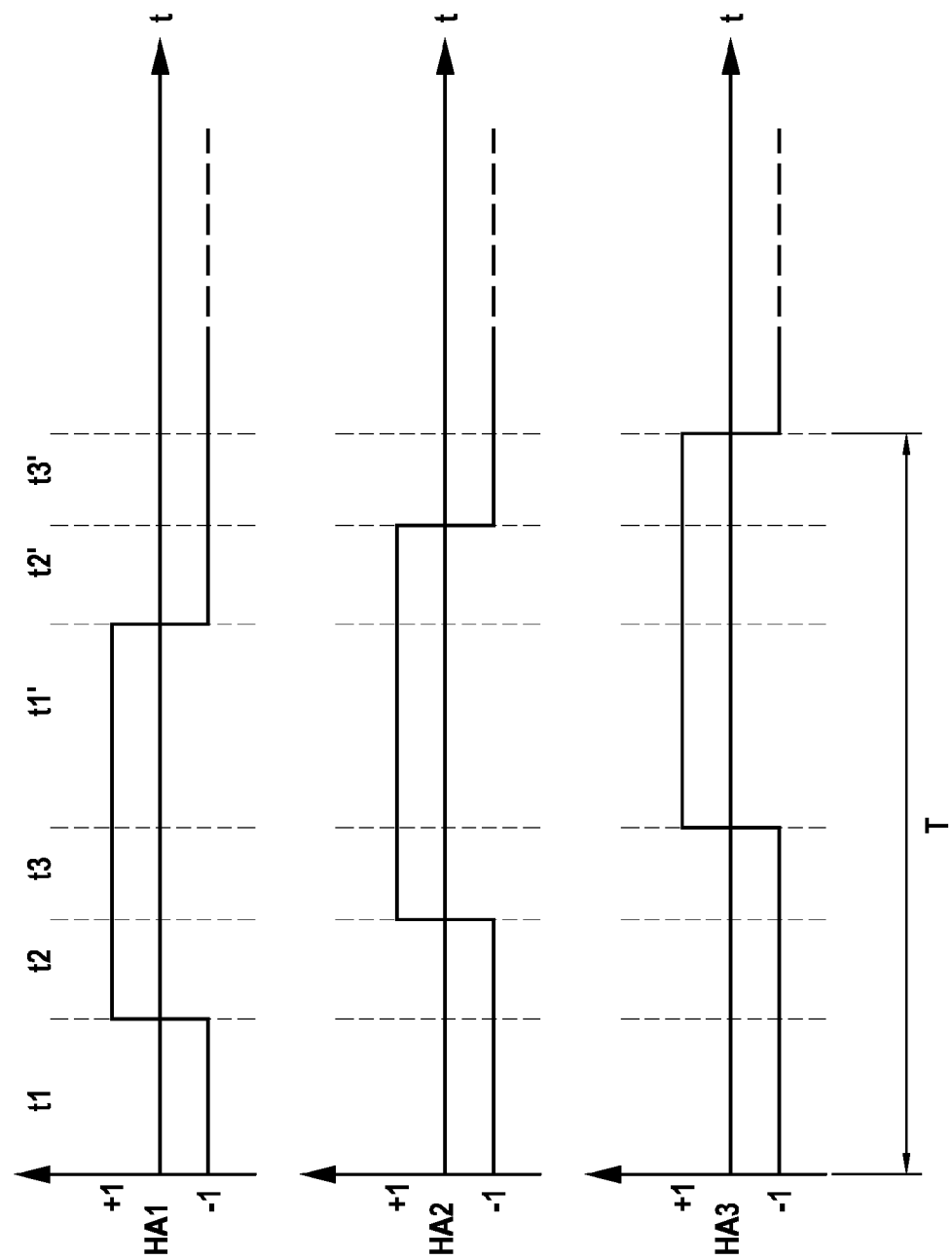
FIG. 4 shows a schematic illustration of the timing diagrams as form the basis of an actuation of a three port voltage converter according to one embodiment.

FIG. 4 shows a schematic illustration of the time profiles of the switching states for driving a three-port voltage converter 2. Illustrated here are the switching states of the half bridges HA1, HA2, HA3 of the first driver circuit 10. Here, a value of −1 in each case denotes that the lower switching element of the respective half bridge HA1, HA2, HA3 is closed and the upper switching element of the corresponding half bridge HA1, HA2, HA3 is open.

Analogously, a value of +1 denotes that the upper switching element of the respective half bridge HA1, HA2, HA3 is closed and the lower switching element is open. Driving the half bridges HA1, HA2, HA3, in particular the switching elements in these half bridges HA1, HA2, HA3, can be implemented periodically in this case. Here, the period duration is denoted by T. During a first time interval t1, the lower switching elements of the first and second half bridge HA1, HA2 are closed and the corresponding upper switching elements are open. In the third half bridge HA3, the upper switching element is closed and the corresponding lower switching element is open. Following this, during a second time interval t2, the lower switching element of the first half bridge HA1 is opened and the upper switching element of the first half bridge HA1 is closed. In a third time interval t3, the lower switching element is also open and the upper switching element is also closed in the second half bridge HA2. Here, the sum of the three time intervals t1, t2 and t3 in each case forms half of the period duration T. This is followed by three further time intervals t1', t2' and t3', during which the switching states are exactly inverted to the time intervals t1, t2 and t3 in each case. During the first time interval t1, t1', the first primary winding 11 generates a magnetic field in the first transformer core 41, said magnetic field inducing a voltage in the first secondary winding 21. In the same way, the second primary winding 12 generates a magnetic field in the second transformer core 42, said magnetic field inducing a voltage in the second secondary winding 22. In the region of the two transformer cores 41, 42 around which the tertiary winding 31 is wound, the magnetic fields at least approximately cancel one another out in the process, and so no significant voltage is induced in the tertiary winding 31. This allows electrical energy to be transferred from the primary windings 11, 12 to the secondary windings 21, 22. In the second time interval t2, t2', the magnetic field is no longer caused in the first transformer core 41 by the first primary winding 11. A magnetic field is only generated in the second transformer core 42 by the second primary winding 12. Accordingly, this electric field induces a voltage both in the second secondary winding 22 and in the tertiary winding 31. This allows electrical energy to be transferred from the second primary winding 12 to both the second secondary winding 22 and the tertiary winding 31.

In the third time interval t3, t3', neither the first primary winding 21 nor the second primary winding 22 is excited, and so a magnetic field is caused in neither of the magnetic cores 41, 42. Accordingly, there is no transfer of electrical energy either between the individual windings.

As can be identified from the preceding description, the amount of energy to be transferred can be controlled by varying the individual time intervals t1, t2, t3 and t1', t2', t3'. By way of example, if electrical energy should only be transferred from the primary windings 11, 12 to the secondary windings 21, 22, the switching elements in the first half bridge HA1 and in the second half bridge HA2 of the first driver circuit 10 are each driven in the same way. Expressed differently, the mid time interval t2, t2' is zero. Here, the ratio of t1 to t3, with t2=0, controls the amount of energy to be transferred.

If, moreover, electrical energy should also be transferred to the tertiary winding 31, this can be achieved by a time delay for the driver signals for the first half bridge HA1 relation to the second half bridge HA2. By way of example, this is achieved by a time interval t2, t2'>0. The greater the time offset t2, t2', and hence the greater the delay between the driver signals for the first half bridge HA1 and for the second half bridge HA2, the greater the amount of electrical energy transferred to the tertiary winding 31.

An AC voltage is respectively provided at the first primary winding 11 and at the second primary winding 12 by driving the first half bridge HA1 and the second half bridge HA2. Here, the provision of the AC voltage in each case starts with an AC voltage that increases starting from 0 volts. Consequently, a phase difference corresponding to the time offset t2, t2' arises between the AC voltage at the first primary winding 11 and the AC voltage at the second primary winding 12 in the case of the same frequency of the AC voltages at the primary winding 11 and at the secondary winding 12.

The AC voltages present at the connectors of the secondary windings 21, 22 can consequently be rectified by the driver circuit 20. By way of example, an active rectifier circuit can be realized to this end by means of the half bridges HB1, HB2, HB3 provided in the driver circuit 20. The AC voltage present at the connectors of the tertiary winding 31 can be realized by means of a rectifier circuit 30, in particular an active or passive rectifier circuit.

In addition to the preceding transfer of electrical energy from the primary windings 11, 12 to the secondary windings 21, 22 and, simultaneously, to the tertiary winding 31, it is also possible to transfer electrical energy from the secondary windings 21, 22 to the tertiary winding 31 without the primary windings 11, 12 having to be driven in the process. To this end, the first secondary winding 21 and the second secondary winding 22 are excited by the second driver circuit 20. In this case, the excitation of the second secondary winding 22 is implemented with the reverse polarity to the excitation of the first secondary winding 21. In this way, the magnetic fields caused by the two secondary windings 21, 22 generate a magnetic flux extending in the same direction in the region of the transformer cores 41, 42 surrounded by the tertiary winding 31, correspondingly causing a voltage in the tertiary winding 31. Since the two magnetic fluxes in the first transformer core 41 and in the second transformer core 41 oppose one another in this case, the voltages caused in the first primary winding 11 and in the second primary winding 12 cancel one another out.

Figure 5:
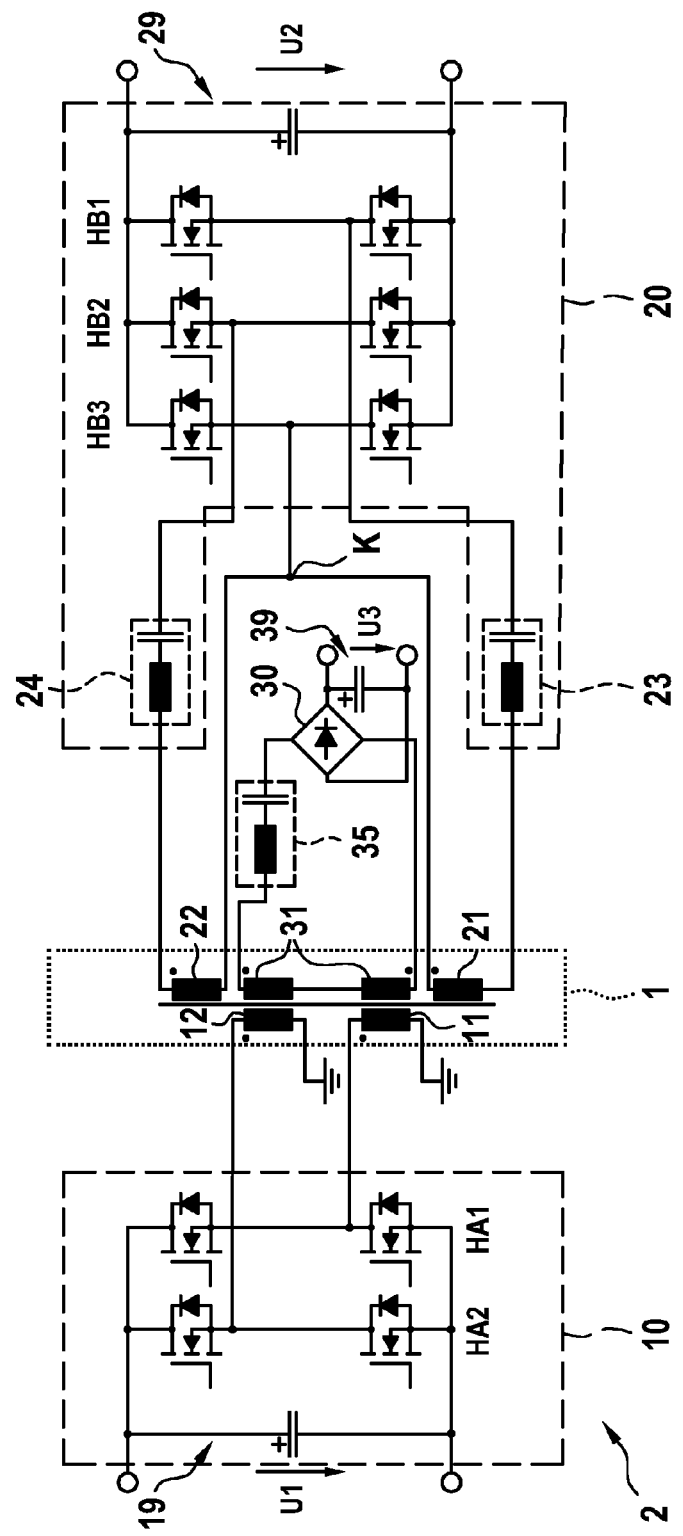
FIG. 5 shows a schematic illustration of a schematic diagram of a three-port voltage converter according to a further embodiment.

FIG. 5 shows a schematic illustration of a schematic diagram for a three-port voltage converter 2 according to a further embodiment. Here, the circuit largely corresponds to the circuit arrangement as per FIG. 3. Therefore, the statements already made in respect of FIG. 3 also apply to this embodiment, provided this is meaningful. The circuit arrangement as per FIG. 5 merely differs from the circuit arrangement of FIG. 3 in that the primary resonant circuits 13, 14 are omitted. In this embodiment, two secondary resonant circuits 23, 24 and a tertiary resonant circuit 35 are provided in place of the two primary resonant circuits 13, 14 for a resonant excitation of the three-port voltage converter 2. In this way, resonant excitation can be achieved, even without resonant circuits on the primary windings 11, 12.

Figure 6:
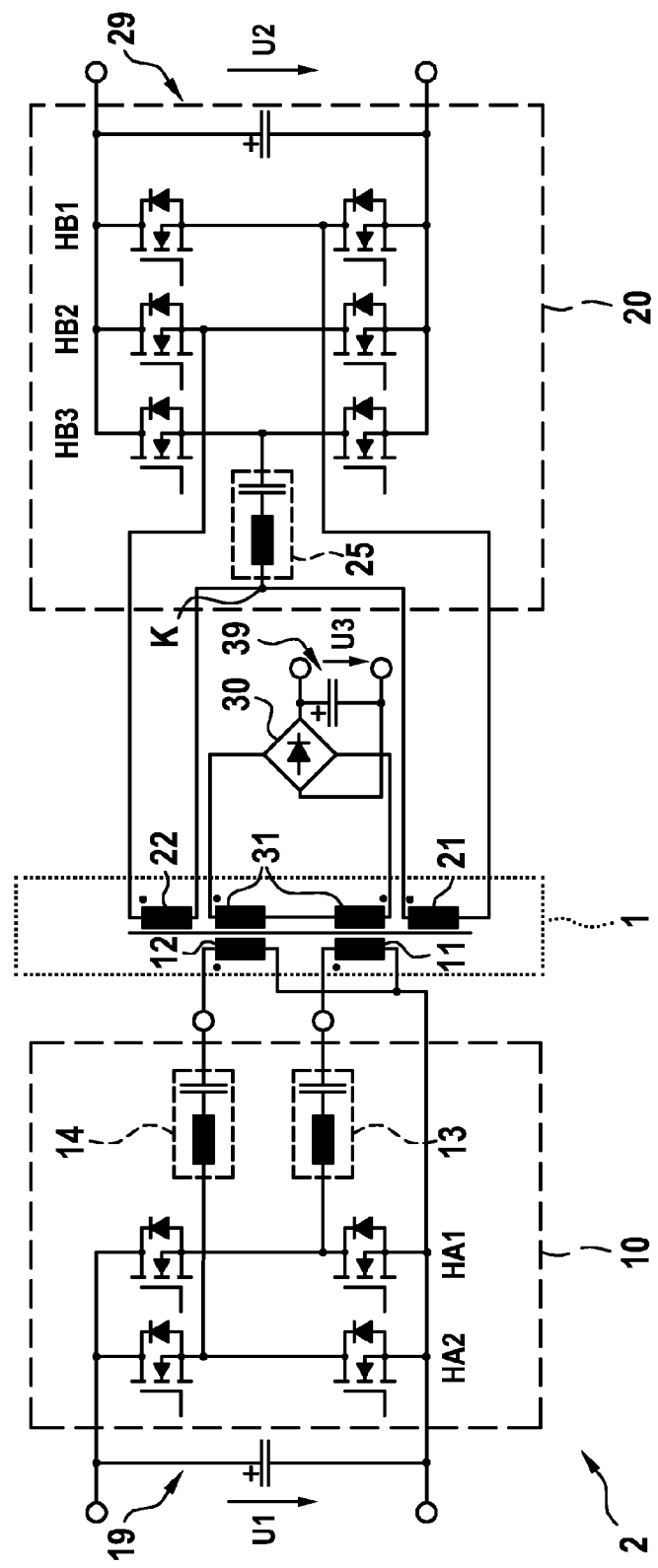
FIG. 6 shows a schematic illustration of a schematic diagram of a three-port voltage converter according to a further embodiment.

FIG. 6 shows a schematic illustration of a three-port voltage converter 2 as per one embodiment. This three-port voltage converter 2 differs from the voltage converter as per FIG. 4 in that the first driver circuit 10 only comprises two half bridges HA1 and HA2. Consequently, the third half bridge HA3 for the first driver circuit 10 can be omitted.

Figure 7:
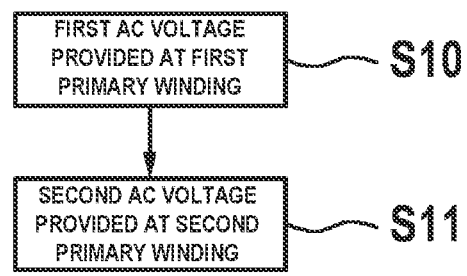
FIG. 7 shows a flowchart as forms a basis for a method for transferring electrical energy according to one embodiment.

FIG. 7 shows a schematic illustration of a flowchart as forms the basis for a method for transferring electrical energy using one of the above-described transformers 1, for example by means of a three-port voltage converter 2. A first AC voltage is provided in step S10 at the first primary winding 11 and a second AC voltage is provided at the second primary winding 12 in step S11. The provision of the second AC voltage at the second primary winding 12 can be implemented with a time delay t2, t2' in relation to the provision of the first AC voltage. In particular, the time delay t2, t2' can be set on the basis of a target voltage at the tertiary winding 31.

Moreover, all explanations already provided further above in conjunction with the three-port voltage converter also apply to this method and to the method described below.

Figure 8:
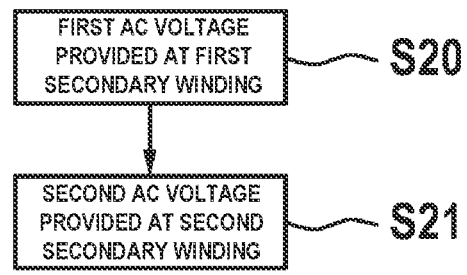
FIG. 8 shows a flowchart as forms a basis for a method for transferring electrical energy according to a further embodiment.

FIG. 8 shows a schematic illustration of a flowchart for a further method for transferring electrical energy in an above-described transformer 1, for example by means of a three-port voltage converter. A first AC voltage is provided at the first secondary winding 21 in step S20 and a second AC voltage is provided at the second secondary winding 22 in step S21. In particular, the two AC voltages are provided in such a way in the process that the magnetic flux caused by the first AC voltage and the magnetic flux caused by the second AC voltage extend in the same direction in the tertiary winding 31 and consequently complement one another. In particular, this therefore allows an AC voltage to be applied to the first secondary winding 21 which has an opposite polarity in relation to the AC voltage at the second secondary winding 22; i.e., the AC voltages have a phase offset of 180°.

In summary, the present invention relates to a galvanically isolated transfer of electrical energy between three voltage systems. To this end, provision is made of a transformer which has a total of five windings. Targeted driving of the individual windings allows the transfer between the individual voltage systems to be controlled in the process.

The invention claimed is:

1. A three-port voltage converter (2), comprising:
a transformer (1) having
a first ring-shaped transformer core (41),
a second ring-shaped transformer core (42),
a first primary winding (11), disposed on the first transformer core (41),
a second primary winding (12), disposed on the second transformer core (42),
a first secondary winding (21), disposed on the first transformer core (41),
a second secondary winding (22), disposed on the second transformer core (42), and
a tertiary winding (31), disposed on the first transformer core (41) and the second transformer core (42);
a first driver circuit (10), configured to provide a first AC voltage at the first primary winding (11), provide a second AC voltage at the second primary winding (12), and provide a time delay (t2, t2') between the provision of the first AC voltage at the first primary winding (11) and the provision of the second AC voltage at the second primary winding (12), wherein the time delay (t2, t2') is adjustable on the basis of a target voltage at the tertiary winding (31);
a second driver circuit (20), configured to rectify an AC voltage applied to the first secondary winding (21) and to rectify an AC voltage applied to the second secondary winding (22) or to provide a first AC voltage at the first secondary winding (21) and provide a second AC voltage at the second secondary winding (22), wherein the second driver circuit (20) comprises a first secondary resonant circuit (23), which is electrically coupled to the first secondary winding (21), and a second secondary resonant circuit (24), which is electrically coupled to the second secondary winding (22); and
a rectifier circuit (30), configured to rectify an AC voltage applied to the tertiary winding (31), wherein the rectifier circuit (30) comprises a tertiary resonant circuit (35), which is electrically coupled to the tertiary winding (31).

2. The three-port voltage converter (2) as claimed in claim 1, wherein the first driver circuit (10) comprises a first primary resonant circuit (13), which is electrically coupled to the first primary winding (11), and a second primary resonant circuit (14), which is electrically coupled to the second primary winding (12).

3. The three-port voltage converter (2) as claimed in claim 2, wherein the first driver circuit (10) is configured to provide a respective rectangular voltage to the first primary resonant circuit (13) and to the second primary resonant circuit (14) and wherein a duty cycle of the rectangular voltages is adaptable on the basis of an electric power to be transferred.

4. The three-port voltage converter (2) as claimed in claim 1, wherein the second driver circuit (20) comprises a secondary resonant circuit (25), which is electrically coupled to the first secondary winding (21) and to the second secondary winding (22) at a node (K).

5. The three-port voltage converter (2) as claimed in claim 1, wherein
the first secondary winding (21) and the second secondary winding (22) are excited by the second driver circuit, and
the excitation of the second secondary winding (22) is implemented with reverse polarity to the excitation of the first secondary winding (21).

6. A method for transferring electrical energy using a transformer (1) having a first ring-shaped transformer core (41), a second ring-shaped transformer core (42), a first primary winding (11), disposed on the first transformer core (41), a second primary winding (12), disposed on the second transformer core (42), a first secondary winding (21), disposed on the first transformer core (41), a second secondary winding (22), disposed on the second transformer core (42), and a tertiary winding (31), disposed on the first transformer core (41) and the second transformer core (42), the method comprising the steps of:
- providing (S10), with a first driver circuit (10), a first AC voltage at the first primary winding (11);
- providing (S11), with the first driver circuit (10), a second AC voltage at the second primary winding (12) with a time delay (t2, t2') in relation to the provision (S10) of the first AC voltage, wherein the time delay (t2, t2') is set on the basis of a target voltage at the tertiary winding (31);
- rectifying, with a second driver circuit (20), an AC voltage applied to the first secondary winding (21);
- rectifying, with the second driver circuit (20), an AC voltage applied to the second secondary winding, wherein the second driver circuit (20) comprises a first secondary resonant circuit (23), which is electrically coupled to the first secondary winding (21), and a second secondary resonant circuit (24), which is electrically coupled to the second secondary winding (22); and
- rectifying, with a rectifier circuit (30), an AC voltage applied to the tertiary winding (31), wherein the rectifier circuit (30) comprises a tertiary resonant circuit (35), which is electrically coupled to the tertiary winding (31).

7. A method for transferring electrical energy using a transformer (1) having a first ring-shaped transformer core (41), a second ring-shaped transformer core (42), a first primary winding (11), disposed on the first transformer core (41), a second primary winding (12), disposed on the second transformer core (42), a first secondary winding (21), disposed on the first transformer core (41), a second secondary winding (22), disposed on the second transformer core (42), and a tertiary winding (31), disposed on the first transformer core (41) and the second transformer core (42), the method including the steps of:
- providing (S20), with a first driver circuit (10), a first AC voltage at the first secondary winding (21);
- providing (S21), with the first driver circuit (10), a second AC voltage at the second secondary winding (22) with a time delay (t2, t2');
- rectifying, with a second driver circuit (20), an AC voltage applied to the first secondary winding (21);
- rectifying, with the second driver circuit (20), an AC voltage applied to the second secondary winding, wherein the second driver circuit (20) comprises a first secondary resonant circuit (23), which is electrically coupled to the first secondary winding (21), and a second secondary resonant circuit (24), which is electrically coupled to the second secondary winding (22); and
- rectifying, with a rectifier circuit (30), an AC voltage applied to the tertiary winding (31), wherein the rectifier circuit (30) comprises a tertiary resonant circuit (35), which is electrically coupled to the tertiary winding (31);
- wherein the magnetic flux through the first transformer core (41) and the magnetic flux through the second transformer core (42) extend in the same direction in a region surrounded by the tertiary winding (31), and wherein the time delay (t2, t2') is set on the basis of a target voltage at the tertiary winding (31).

* * * * *